United States Patent [19]

Belart et al.

[11] Patent Number: 4,703,978
[45] Date of Patent: Nov. 3, 1987

[54] HYDRAULIC BRAKE SYSTEM

[75] Inventors: Juan Belart, Walldorf; Wolfram Seibert, Darmstadt; Norbert Ocvirk, Offenbach, all of Fed. Rep. of Germany

[73] Assignee: Alfred Teves GmbH, Frankfurt am Main, Fed. Rep. of Germany

[21] Appl. No.: 822,039

[22] Filed: Jan. 24, 1986

[30] Foreign Application Priority Data

Jan. 25, 1985 [DE] Fed. Rep. of Germany ....... 3502474
Jan. 25, 1985 [DE] Fed. Rep. of Germany ....... 3502473

[51] Int. Cl.⁴ .................... B60T 15/06; B60T 13/20; B60T 8/44
[52] U.S. Cl. .................... 303/52; 60/547.1; 60/582; 188/345; 188/356; 188/358; 303/92; 303/114; 303/116; 303/119
[58] Field of Search .................... 303/50–56, 303/10–12, 113–119, 91, 92, 101, 100, 110, 13–15, 93, 6 R; 188/345, 356, 181, 151 A, 358; 60/545, 547.1, 534, 548, 550, 552, 555, 582, 560, 575, 578

[56] References Cited

U.S. PATENT DOCUMENTS

| | | | |
|---|---|---|---|
| 3,692,367 | 9/1972 | Kuromitsu | 303/52 |
| 4,181,371 | 1/1980 | Adachi | 303/50 |
| 4,240,672 | 12/1980 | Tokunaga et al. | 303/116 X |
| 4,415,210 | 11/1983 | Belart et al. | 303/92 X |
| 4,416,491 | 11/1983 | Belart et al. | 303/52 X |
| 4,443,040 | 4/1984 | Farr | 303/50 |
| 4,482,192 | 11/1984 | Leiber | 303/100 |
| 4,492,413 | 1/1985 | Belart et al. | 303/114 X |
| 4,523,791 | 6/1985 | Belart et al. | 303/114 X |
| 4,568,130 | 2/1986 | Leiber | 303/92 |
| 4,580,847 | 4/1986 | Burgdorf | 303/100 |
| 4,586,591 | 5/1986 | Belart | 303/114 X |
| 4,600,243 | 7/1986 | Belart et al. | 303/114 X |
| 4,603,918 | 8/1986 | Leiber et al. | 60/547.1 X |
| 4,611,858 | 9/1986 | Belart | 303/114 X |
| 4,641,891 | 2/1987 | Belart | 303/114 X |
| 4,641,894 | 2/1987 | Belart | 303/114 |
| 4,643,488 | 2/1987 | Reinartz | 303/114 |
| 4,643,489 | 2/1987 | Reinartz et al. | 303/114 |
| 4,653,813 | 3/1987 | Burgdorf | 303/100 X |
| 4,655,511 | 4/1987 | Leiber | 303/114 X |

Primary Examiner—Douglas C. Butler
Attorney, Agent, or Firm—James B. Raden

[57] ABSTRACT

A hydraulic brake system comprises a pedal-actuated tandem generator cylinder (3), an auxiliary-pressure supply system with electromotively driven pump (8) and pressure fluid supply reservoir (31) and an auxiliary-pressure control valve (7, 67). The tandem generator cylinder (3) is provided with a bore (24) extending wherethrough is an actuating rod (25, 72) which acts upon a primary piston (4, 68) and whose end remote from the primary piston (4, 68) cooperates with an initial-pressure piston (16) or a vacuum brake power booster (84) slidably supported in the bore (24) and being in turn coupled with the brake pedal (19) by way of a piston rod (17, 86). An annular piston (26) is displaceably arranged in the bore (24) between the primary piston (4, 68) and the initial-pressure piston (16) or, respectively, the force-output member (74) of the booster (84). The annular piston subdivides the space between the primary piston (4, 68) and the initial-pressure piston (16) or the force-output member (74) into two chambers (59 and 44), the one thereof communicating with a feed tank (6) of the tandem generator cylinder (3), while the other one is connected to the pressure-fluid supply reservoir (31). The working chamber (44) accommodates an annular disc (29) comprising a ramp (30) which coacts with the contact pin (32) of an electric switch (33) which switches on the pump (8) when the initial-pressure piston (16) or the force-output member (74) has displaced the annular disc (29) in the actuating direction. An auxiliary cylinder (62), or the working chambers of the vacuum brake power booster (84) whereon the brake pedal (19) is acting, is connected to the auxiliary-pressure control valve (7, 67). The pressure in the auxiliary cylinder (62) or the pressure in the working chambers of the booster (84) controls the pressure of the pump (8) which communicates with the feed tank (6).

4 Claims, 2 Drawing Figures

HYDRAULIC BRAKE SYSTEM

BACKGROUND OF THE INVENTION

The present invention relates to a hydraulic brake system comprising a pedal-actuated braking pressure generator which disposes of a feed tank and to which the wheel brakes are connected by way of pressure-fluid lines. The system further comprising an auxillary-pressure supply system with pump and pressure-fluid supply reservoir, and an auxilliary-pressure control valve which produces an auxiliary pressure proportional to the pedal force.

In a known brake system of this type, there is provision of a tandem master cylinder with a hydraulic brake power booster connected upstream thereof as well as an auxiliary-pressure supply system comprising a pump and a hydraulic accumulator. The hydraulic booster contains an auxiliary-pressure control valve which, on application of the brake pedal, causes an auxiliary pressure proportional to the pedal force and acting on the pistons in the master cylinder. The boosting factor of the brake system is selected by the ratio of the surfaces of a transmission piston in the interior of the brake power booster in relation of the surface of an actuating piston coupled mechanically to the brake pedal. As the brake circuits are designed as static circuits, the volume of the pressure chambers in the master cylinders must be adapted to the respective brake system.

Furthermore, slip-controlled brake systems are known wherein the hydraulic braking pressure generator is likewise composed of a master cylinder and a hydraulic brake power booster connected upstream thereof (for instance German printed and published patent applications Nos. 30 40 561 and 30 40 562). During slip control, dynamic pressure out of the auxiliary-pressure supply system will be introduced by way of the booster chamber into the brake circuits which are connected to the master cylinder and which are static until commencement of slip control. This way, the discharge of pressure fluid into the pressure supply reservoir during the phases of pressure reduction will be compensated. Such systems are rather complicated and costly.

Likewise, known are slip-controlled brake systems, the braking pressure generator of which are also composed of a hydraulic brake power booster with a master cylinder connected downstream thereof, and wherein on commencement of slip control dynamic pressure is metered out of the brake power booster directly into the wheel brake cylinders of the wheel connected to the master cylinder. To this end, the wheel brakes connected to the static brake circuits communicate by way of electromagnetically actuable multidirectional control valves with the master cylinder so that change-over of these valves causes interruption of the hydraulic connection between the master cylinder and the wheel brakes and permits connection of the auxiliary-pressure source instead of the master cylinder. During normal braking operations (i.e., without slip control) or until change-over of the solenoid valves, respectively, the circuits concerned are strictly static brake circuits.

It is an object of the present invention to develop a brake system which is simple and entails little effort and which system extends a slip-controlled brake system by insertion of electromagnetically controllable inlet and outlet valves and by equipment with a measuring and control electronics, and wherein dynamic pressure out of an auxiliary-pressure supply system is introduced into the pressure chambers of the braking pressure generator when slip control commences.

SUMMARY OF THE INVENTION

Briefly, a hydraulic brake system is provided comprising a pedal-actuated braking pressure generator which disposes of a feed tank and to which the wheel brakes are connected by way of pressure-fluid lines. The system further comprising an auxiliary-pressure control valve which produces an auxiliary pressure proportional to the pedal force. The braking pressure generator contains a bore extending through which is an actuating rod acting on the braking pressure generator piston. The rod's end remote from the braking pressure generator piston cooperates with an initial-pressure piston which is slidable in the bore and, in turn, is coupled to the brake pedal (19). The bore slidably accommodates an annular piston which subdivides the space between the braking pressure generator piston and the initial-pressure piston (16) into two chambers (44, 59). The one thereof communicates by way of a channel with the feed tank of the braking pressure generator while the other one is connected by way of a pressure-fluid line to the pressure-fluid supply reservoir.

It is a considerable advantage that the inventive brake system can be used directly as a hydraulic unit of a slip-controlled brake system. In normal operation, static braking is effected, for which purpose there is no need to supply hydraulic medium out of the auxiliary-pressure supply system in the phase of pressure build-up.

BRIEF DESCRIPTION OF THE DRAWING

The invention will now be described in detail in conjunction with the accompanying drawing wherein.

DETAILED DESCRIPTION

Figure 1:
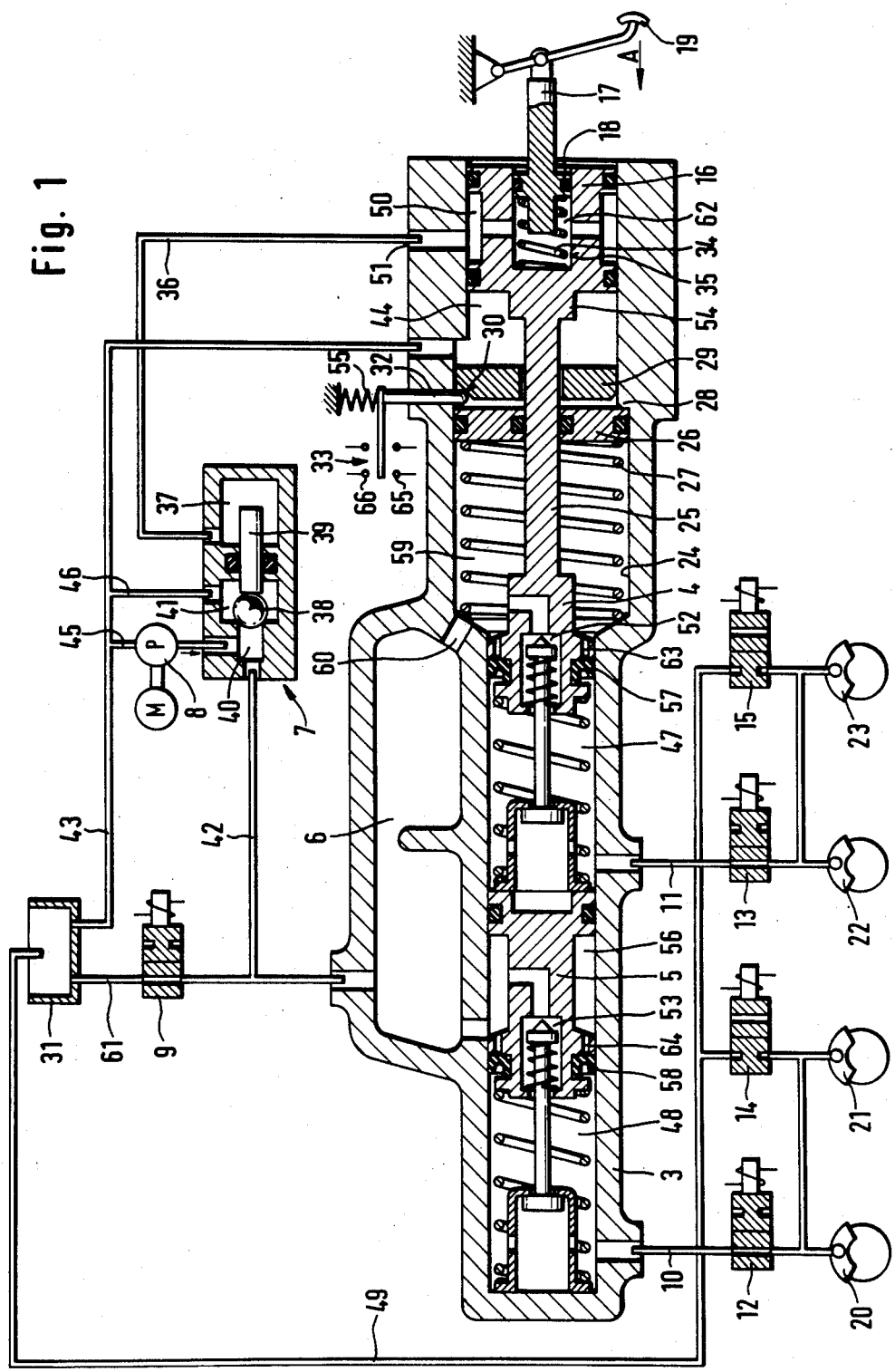
FIG. 1 is a cross-sectional view of the braking pressure generator system in accordance with the present invention; and, FIG. 2 is a view similar to FIG. 1 shown in conjunction with a vacuum brake power booster.

The braking pressure generator according to FIG. 1 comprises a tandem generator cylinder 3 with the primary piston 4 slidably arranged therein and with floating piston 5, the pressure-fluid supply reservoir 31, the control valve 7, the electromotively driven pump 8, the change-over valve 9, the solenoid valves 12, 13 inserted into the brake lines 10 and 11 leading to the wheel brakes 20 to 23, the reflux valves 14 and 15 and the initial pressure piston 16 incorporating the piston rod 17 with piston 18, which piston rod is articulated at the brake pedal 19.

At its end close to the pedal, the tandem generator cylinder 3 contains a larger-diameter bore 24 through which the actuating rod 25 of the primary piston 4 is extending. An annular piston 26 is slidably arranged on the actuating rod 25 and pressed against the stationary stop 28 by a compression spring 27. Furthermore, the bore 24 contains an annular disc 29 which coacts with a contact pin 32 that is part of the electric switch 33. The piston 18 arranged in the initial-pressure piston 16 and coupled to the piston rod 17 is displaceable in the blind-end bore 35 in opposition to the force of a resetting spring 34, the said blind-end bore 35 communicating with the chamber 37 by way of the control line 36. The control valve 7 includes a valve member 38 which is exposed to a plunger piston 39 that is acted upon by the pressure in the chamber 37 of the control valve 7. The valve member 38 controls a passage connecting the chamber 40 in front of the valve member 38 with the valve chamber 41. The chamber 40 in front of the valve member 38 is connected to the pressure side of the pump 8, on the one hand, and, on the other hand, to the pressure line 42 which is in communication with the feed tank 6 of the tandem generator cylinder 3. The pressure-fluid supply reservoir 31 is, by way of the pressure fluid line 43, in communication with the working chamber 44 between the annular piston and the initial-pressure piston 16 and, moreover, by way of the branch line 45 and 46 with the pump 8 and the valve chamber 41 of the control valve 7. Interposed into the brake lines 10, 11 leading from the pressure chambers 47, 48 of the tandem generator cylinder 3 to the wheel brakes 20 to 23 are multidirectional control valves 12, 13 which receive corrective signals from a wheel-slip and, respectively, wheel-lock monitoring electronics (not shown). The reflux valves 14, 15 connected downstream of the solenoid valves 12, 13 open or close a connection between the wheel brakes 20 to 23, by way of the return line 49, and the pressure-fluid supply reservoir 31.

On braking operation, the brake pedal 19 is depressed in the direction of the arrow A, in consequence whereof the piston rod 17 with piston 18 is moved in the blind-end bore 35 of the initial-pressure piston 16 in opposition to the force of the resetting spring 34 so that the pressure fluid disposed in the auxiliary cylinder 62 is displaced by way of the annular chamber 50, the port 51 and the control line 36 into the chamber 37 of the control valve 7 until the plunger piston 39 presses the valve member 38 tightly on the valve seat in the housing of the control valve 7 and thereby closes the pressure-fluid passage from the pump 8 to the valve chamber 41. Simultaneously with the further movement of the piston 18 and, respectively, the piston rod 17 in the actuating direction, the initial-pressure piston 16 likewise displaces together with the actuating rod 25 and the primary piston 4, while braking pressure develops in the pressure chambers 47 and 48 after closure of the central valves 52, 53, which pressure propagates through the brake lines 10, 11 and the solenoid valves 12, 13 switched to open passage up to the wheel cylinders of the wheel brakes 20 to 23. Since merely atmospheric pressure is prevailing in the feed tank 6 in this first phase of the braking action, likewise the chambers in front of and behind the annular piston 26 are practically pressureless, until the annular disc 29 abuts on the collar 54 of the actuating rod 25 and is entrained by same so far to the left (in the actuating direction) that the chamfer 30 acting as ramp displaces the contact pin 32 outwardly in opposition to the force of the switch spring 55 and, in so doing, actuates the contact 66 of the electric switch 33 which serves to switch on the pump 8 and to close the change-over valve 9.

The pump 8 supplies the pressure fluid from the pressure-fluid supply reservoir 31 by way of the pressure-fluid line 43 into the chamber 40 of the control valve 7 and from here by way of the pressure line 42 into the feed tank 6 which is in communication with the bore 24 of the tandem generator cylinder 3 and the annular chamber 56 of the floating piston 5. As soon as the pressure in the feed tank 6 is higher than that prevailing in the pressure chambers 47, 48 of the tandem generator cylinder 3, the piston sleeves 57, 58 and, respectively, the supply bores 63, 64 will open so that a direct connection is established between the pump 8 and the wheel brakes 20 to 23.

To prevent further movement of the initial-pressure piston 16 to the left (that is, in the actuating direction), the annular piston 26 is sealed both relative to the actuating rod 25 and relative to the bore 24 of the tandem generator cylinder 3 so that the full pump pressure becomes effective on the end surface of the annular piston 26 facing the primary piston 4 and urges said piston 26 in opposition to the actuating direction against the stationary stop 28. As soon as the brake pedal 19 is relieved from load, which means when the braking action has terminated, the pressure decreases in the auxiliary cylinder 62 in front of the piston 18, so that the plunger piston 39 moves into the chamber 37 of the control valve 7 and hence opens the pressure-fluid passage from the chamber 40 into the valve chamber 41. Now, the pressure does not drop in the chamber 40 only, but drops likewise in the feed tank 6 in the pressure chambers 47, 48 of the tandem generator cylinder 3 so that the primary piston 4 and the floating piston 5 are allowed to re-assume their release position. Simultaneously, the contact pin 32 slides back into its initial position, the electric switch 33 disconnecting the pump 8 and causing the change-over valve 9 to open.

When, during a braking action, the slip monitoring electronics (not shown) detects the tendency to lock of a vehicle wheel, it will close the solenoid valve 12 or 13 allocated to that wheel immediately before said vehicle wheel reaches the position where it locks, while simultaneously, with the pump 8 operating and the change-over valve 9 closed, the reflux valve 14 or 15 connected downstream will be opened in order to allow pressure reduction in the wheel cylinder of the locking vehicle wheel.

When the pump 8 is switched on and the change-over valve 9 has assumed its closed position, the pump pressure developing in the bore 24 will ensure that the annular piston 26 is pressed against the stationary stop 28. In this event, the initial-pressure piston 16 is allowed to move only so far in the actuating direction (to the left in the drawing) until the collar 54 of the actuating rod 25 has displaced the annular disc 29 against the annular piston 26. However, on failure of the pump 8 (i.e. of the energy supply), the piston rod 17 will shift the initial-pressure piston 16 and the actuating rod 25 by way of the resetting spring 34 to the left during brake application and finally will entrain both the annular disc 29 and the annular piston 26 in opposition to the force of the compression spring 27. The solenoid valves 12, 13, the reflux valves 14, 15, and the change-over valve 9 adopt the positions shown in the drawing. As soon as the annular disc 29 is on the left side of the contact pin 32, the contact pin 32 will slide downwardly in the direction of the working chamber 44 and will abut on the lower contact 65. In this case, failure of the auxiliary-pressure supply system is signaled to the driver of the vehicle by an alarm device (not shown).

An essential advantage of the brake system according to FIG. 1 resides in that the need for a conventional brake power booster is obviated in vehicles of low admissible total weight (e.g., of less than 1200 kg). By choosing a generator cylinder with less piston surface or a greater pedal transmission ratio, the braking pressures required may be generated with sufficiently low pedal force, but with extended pedal travel. If the pushrod travel and thus, the travel of the brake pedal 19 exceeds the travel deemed admissible, the electric switch (by way of the contact pin 32) will activate the pressure supply system so that further increase of the braking pressure is effected without causing any travel.

Figure 2:
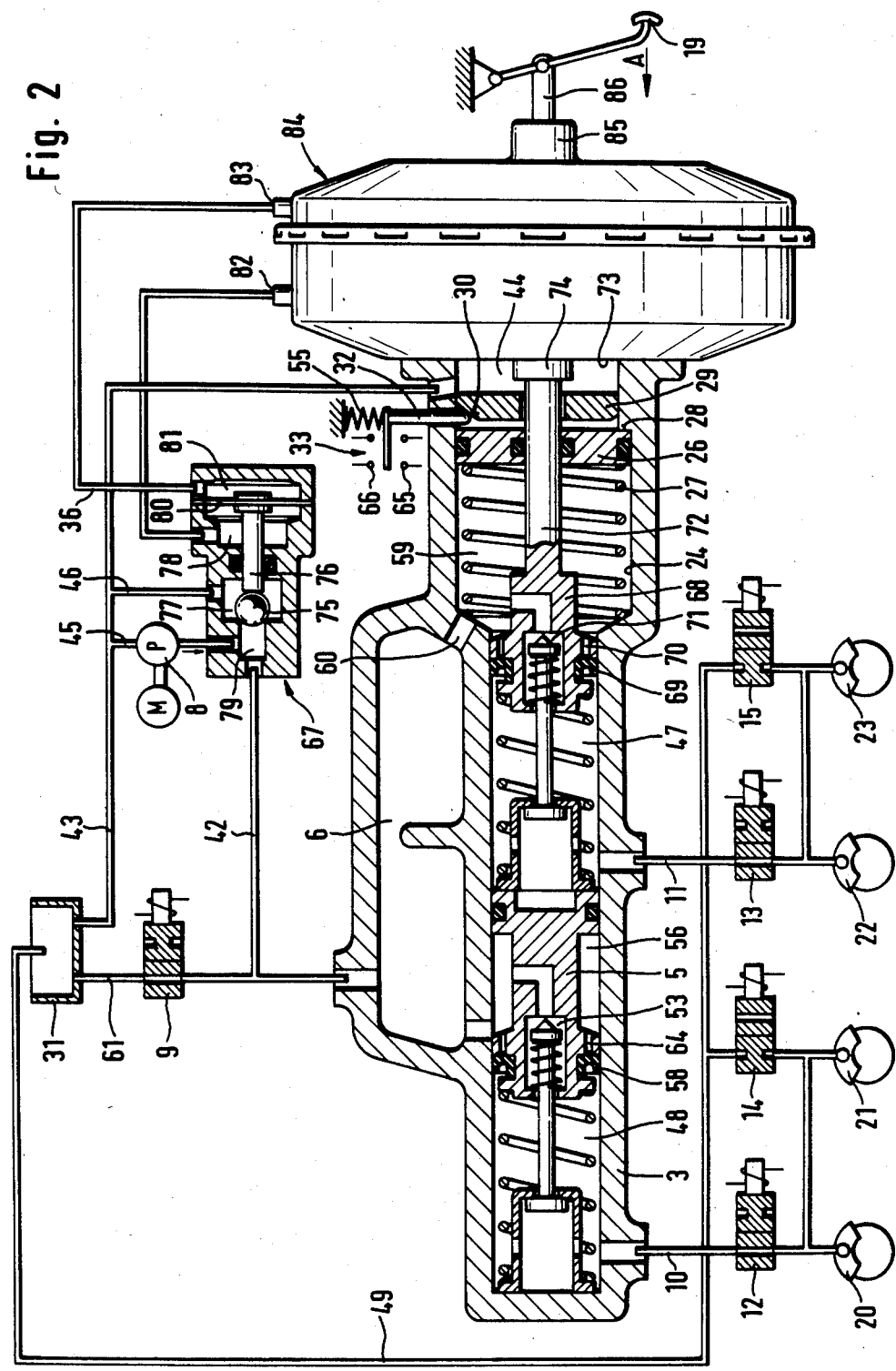

The braking pressure generator according to FIG. 2 comprises the braking pressure generator piston 6B slidably arranged therein and with floating piston 5, the pressure-fluid supply reservoir 31, the auxillary pressure control valve 67, the electromagnetically drive pump 8, the change-over valve 9, the solenoid valves 12, 13 inserted into the brake lines 10 and 11 leading to the wheel brakes 20 to 23, the reflux valves 14 and 15 and the vacuum brake power booster 84 with the piston rod 86 incorporated therein, which piston rod is articulated at the brake pedal 19, and with the force-output member 74 projecting from the end wall 73 of the brake power booster.

At its end close to the pedal, the braking pressure generator 3 contains a larger-diameter both 24 through which the actuating rod 72 of the piston 68 is extending. An annular piston 26 is slidably arranged on the actuating rod 72 and presses against the stationary stop 28 by a compression spring 27. Furthermore, the bore 24 contains an annular disc 29 which coacts with a contact pin 32 that is part of the electric switch 33. The working chamber of the vacuum brake power booster 84 connectible to a vacuum source is by way of a control line connected to the chamber 78 of the auxiliary-pressure control valve 67. The auxiliary-pressure control valve 67 includes a valve member 75 which is exposed to a plunger piston 76 that is acted upon by the pressure in the chambers 78, 81 of the auxiliary-pressure control valve 67. The valve member 75 controls a passage connecting the chamber 79 in front of the valve member 75 with the valve chamber 77. The chamber 79 in front of the valve member 75 is connected to the pressure side of the pump 8, on the one hand, and, on the other hand, to the pressure line 42 which is in communication with the supply reservoir 6 of the braking pressure generator 3. The pressure-fluid supply reservoir 31 is in communication with the working chamber 44 by way of the pressure fluid line 43 between the annular piston 26 and the end wall 73 of the brake power booster 84 and, moreover, by way of the branch lines 45 and 46 with the pump 8 and the valve chamber 77 of the auxiliary-pressure control valve 67. Interposed into the brake lines 10, 11 leading from the pressure chambers 47, 48 of the braking pressure generator 3 to the wheel brakes 20 to 23 are multidirectional control valves 12, 13 which receive corrective signals from a wheel-slip and, respectively, wheel-lock monitoring electronics. The reflux valves 14, 15 connected downstream of the solenoid valves 12, 13 open or close a connection between the wheel brakes 20 to 23 and the return line 49 which leads to the pressure-fluid supply reservoir 31.

On braking operation, the brake pedal 19 is depressed in the direction of the arrow A, in consequence whereof the piston rod 86 displaces the valve piston of the control valve 85 of the vacuum brake power booster 84 so that the force-output member 74 is moved to the left by the movable wall of the booster, air under atmospheric pressure (or under differential pressure, respectively) flowing in through the control line 36 into the chamber 81 of the auxiliary-pressure control valve 67, until the plunger piston 76 presses the valve member 75 tightly on the valve seat in the housing of the auxiliary-pressure control valve 67 and thereby closes the pressure-fluid passage from the pump 8 to the valve chamber 77. Simultaneously, with the further movement of the piston 68 and, respectively, the piston rod 86 in the actuating direction, the actuating rod 72 and the braking pressure generator piston 68 likewise displace, while a braking pressure develops in the pressure chambers 47 and 48 after closure of the central valves 52, 53, which pressure propagates through the brake lines 10, 11 and the solenoid valves 12, 13 switched to open passage up to the wheel cylinders of the wheel brakes 20 to 23. Since merely atmospheric pressure is prevailing in the feed tank 6 in this first phase of the braking action, likewise the chambers in front of and behind the annular piston 26 are practically pressureless, until the annular disc 29 abuts on the force-output member 54 and is entrained by same so far to the left (in the actuating direction) that the ramp 30 displaces the contact pin 32 outwardly in opposition to the force of the switch spring 55 and, in so doing, actuates the contact 66 of the electric switch 33 which serves to switch on the pump 8 and to close the change-over valve 9.

The pump 8 supplies the pressure fluid from the pressure fluid supply reservoir 31 by way of the pressure fluid line 43 into the chamber 79 of the auxiliary-pressure control valve 67 and from there by way of the pressure line 42, into the feed tank 6 which is in communication with the bore 24 of the braking pressure generator 3 and the annular chamber 56 of the floating piston 5. As soon as the pressure in the feed tank 6 is higher than that prevailing in the pressure chamber 47, 48 of the braking pressure generator 3, the piston sleeves 57, 58 and, respectively, the supply bores 63, 64 will open so that a direct connection is established between the pump 8 and the wheel brakes 20 to 23.

To prevent further movement of the force-output member 74 to the left (that is, in the actuating direction), the annular piston 26 is sealed both relative to the actuating rod 25 and relative to the bore 24 of the tandem generator cylinder 3 so that the full pump pressure becomes effective on the end surface of the annular piston 26 facing the piston 4 and urges the piston 26 in opposition to the actuating direction against the stationary stop 28. As soon as the brake pedal 19 is relieved from load, which occurs when the braking action has terminated, the pressure in the working chamber of the brake power booster 84 decreases, so that the plunger piston 76 moves in to the chamber 81 of the auxiliary-pressure control valve 67 and hence opens the pressure-fluid passage from the chamber 79 into the valve chamber 77. Now, the pressure does not drop in the chamber 79 only, but also drops in the feed tank 6 and in the pressure chambers 47, 48 of the braking pressure generator 3 so that the piston 68 and the floating piston 5 are allowed to re-assume their release position. Simultaneously, the contact pin 32 slides back into its initial position, the electric switch 33 disconnecting the pump 8 and causing the change-over valve 9 to open.

When during a braking action, the slip monitoring electronics detects the tendency to lock of a vehicle wheel, it will close the solenoid valve 12 or 13 allocated to that wheel immediately before vehicle wheel reaches the position where it locks, while simultaneously, with the pump 8 operating and the change-over valve 9 closed, the reflux valve 14 or 15 connected downstream will be opened in order to allow pressure reduction in the wheel cylinder of the locking vehicle wheel.

When the pump 8 is switched on and the change-over valve 9 has assumed it closed position, the pump pressure developing in the bore 24 will ensure that the annular piston 26 is pressed against the stationary stop 28. In this event, the force-output member 74 is but allowed to move so far in the actuating direction (to the left) until it has displaced the annular disc 29 against the annular piston 26. However, on failure of the pump 8 (i.e. of the energy supply), the piston rod 86 or, respectively, the force-output member 74 will shift the actuating rod 72 to the left during brake application and finally, will entrain both the annular disc 29 and the annular piston 26 in opposition to the force of the compression spring 27. The solenoid valves 12, 13, the reflux valves 14, 15 and the change-over valve 9 adopt the positions shown in the drawing. As soon as the annular disc 29 is on the left side of the contact pin 32, the contact pin 32 will slide downwardly in the direction of the working chamber 44 and will move into abutment with the lower contact 65. In this case, failure of the auxiliary-pressure supply system is signaled to the driver of the vehicle by an alarm device.

What is claimed is:

1. A hydraulic brake system for use with automotive vehicles having vehicle wheels with wheel brakes, said system comprising, in combination:

a pedal-actuated braking pressure generator including a housing having a tandem generator cylinder including first and second pressure chambers therein, said first chamber being connected to a first selected pair of said wheel brakes by way of pressure fluid lines and said second chamber being connected to a second selected pair of said wheel brakes by way of pressure fluid lines, said pressure generator including a working chamber adjacent said first chamber at the outer end thereof, said pressure generator including an actuating rod extending through said first chamber and said working chamber, said actuating rod being connected at its inner end to a primary piston in said first chamber and being connected at its outer end to an initial-pressure piston in said working chamber;

said initial-pressure piston including a blind-end bore auxiliary cylinder at the outer end portion thereof in which a piston rod is slidably mounted with the outer end of said piston rod being coupled to a brake pedal, said piston rod being resiliently urged toward said brake pedal, and said auxiliary chamber communicating through a passageway in said initial-pressure piston with a port extending through said housing;

an annular piston slidably mounted on said actuating rod between said first chamber and said initial-pressure piston;

an annular member slidably mounted on said actuating rod between said annular piston and said initial-pressure piston;

a switching device including a switching member extending through said housing for engaging said annular member when said initial-pressure piston translates said annular member toward said first chamber;

an auxiliary-pressure supply including a pump which is activated by said switching device, and said pump having a pressure fluid input and a pressure fluid output;

a pressure-fluid supply reservoir; and, an auxiliary-pressure control valve for producing an auxiliary pressure proportional to pedal-induced force, said auxiliary having a first valve chamber connected to said port of said housing by way of a pressure fluid line, a second valve chamber connected to said supply reservoir by way of a pressure fluid line and a third valve chamber connected to said first and second chambers of said pressure chamber and said output of said pump, said auxiliary valve including a valve member extending through said first and second valve chambers for connecting and disconnecting said second and third valve chambers in response to the translation of said piston rod in said auxiliary cylinder.

2. The brake system according to claim 1, wherein said annular member is an annular disc and wherein said annular piston is resiliently urged away from said primary piston against a stationary stop between said first pressure chamber of said pressure generator and said working chamber.

3. The brake system according to claim 1, wherein said piston rod coupled to said brake pedal is resiliently urged away from said auxiliary cylinder toward said brake pedal.

4. The brake system according to claim 1, wherein said switching device includes a pair of contacts which activate an indicator device when said annular member is translated away from said switching member, thereby indicating a failure of said auxiliary pressure supply.

* * * * *